United States Patent [19]

Browder

[11] 3,776,623

[45] Dec. 4, 1973

[54] RAPID REWIND SOUND MOTION CAMERA OR PROJECTOR

[75] Inventor: Lewis B. Browder, Altadena, Calif.

[73] Assignee: Bell & Howell Company, Chicago, Ill.

[22] Filed: Feb. 28, 1972

[21] Appl. No.: 229,948

[52] U.S. Cl. .................... 352/124, 352/166, 226/49
[51] Int. Cl. ............................................ G03b 23/00
[58] Field of Search ........................... 352/124, 166; 226/49, 50, 51, 82, 85

[56] References Cited
UNITED STATES PATENTS

| | | | |
|---|---|---|---|
| 3,609,022 | 9/1971 | Schwartz et al. | 352/124 |
| 2,051,036 | 8/1936 | Foster et al. | 352/124 |
| 1,993,735 | 3/1935 | Foster et al. | 352/124 |
| 2,366,578 | 1/1945 | Tondreau | 226/85 X |
| 3,150,810 | 9/1964 | Heaton | 226/82 X |

*Primary Examiner*—Samuel S. Matthews
*Assistant Examiner*—Michael L. Gellner
*Attorney*—Luc P. Benoit

[57] ABSTRACT

Rapid rewind of a sound motion picture film in a sound motion picture camera or projector is facilitated by the use of a free-running sprocket wheel that is in engagement with the motion picture film on both sides of the sound transducer. During advancement of the film at normal speed, the sprocket wheel cooperates with a film tensioning device in maintaining the film in engagement with a rotary mechanical filter at the sound transducer. During rapid rewind, the tensioning device is released and the sprocket wheel helps to maintain the film spaced from the rotary mechanical filter.

12 Claims, 3 Drawing Figures

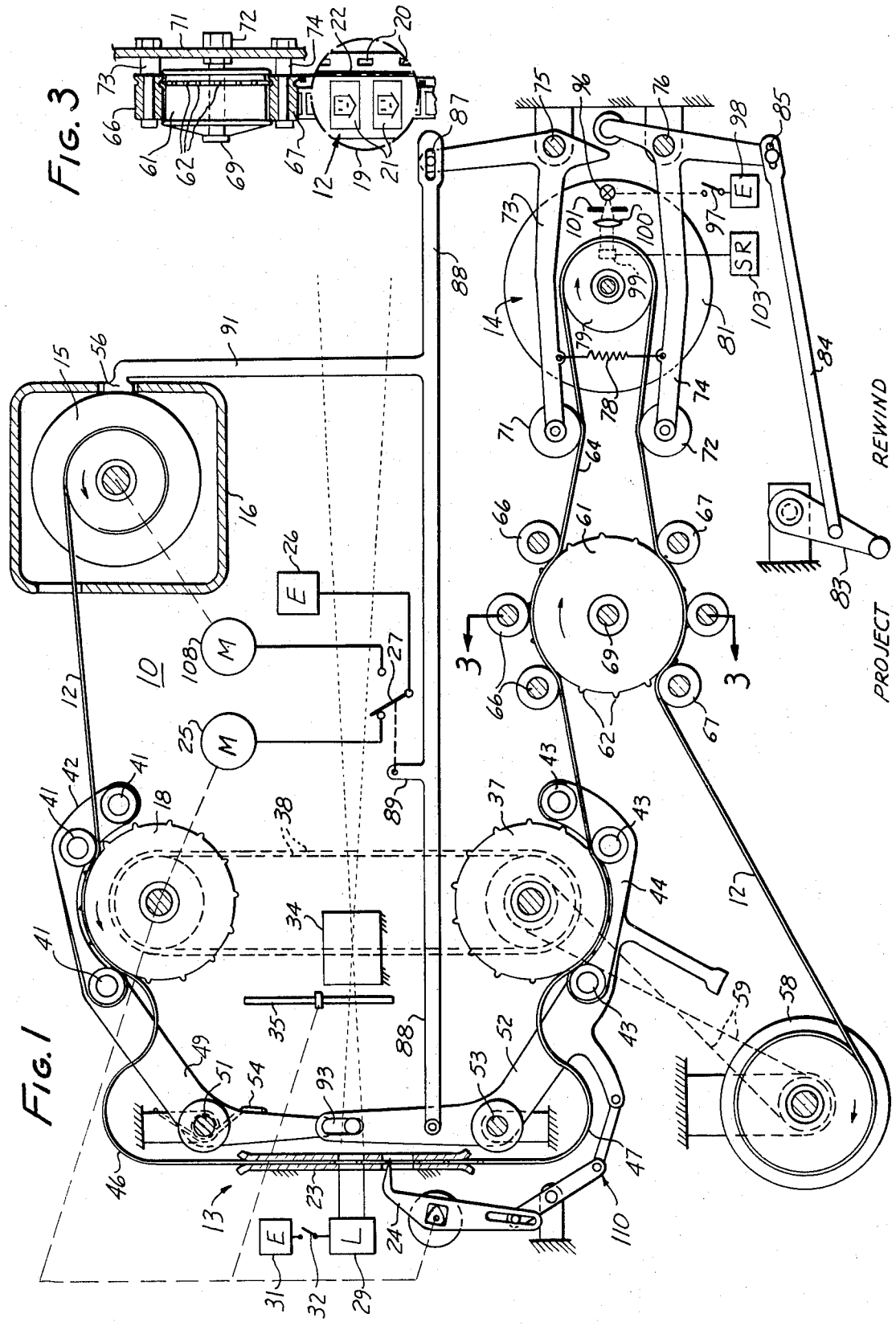

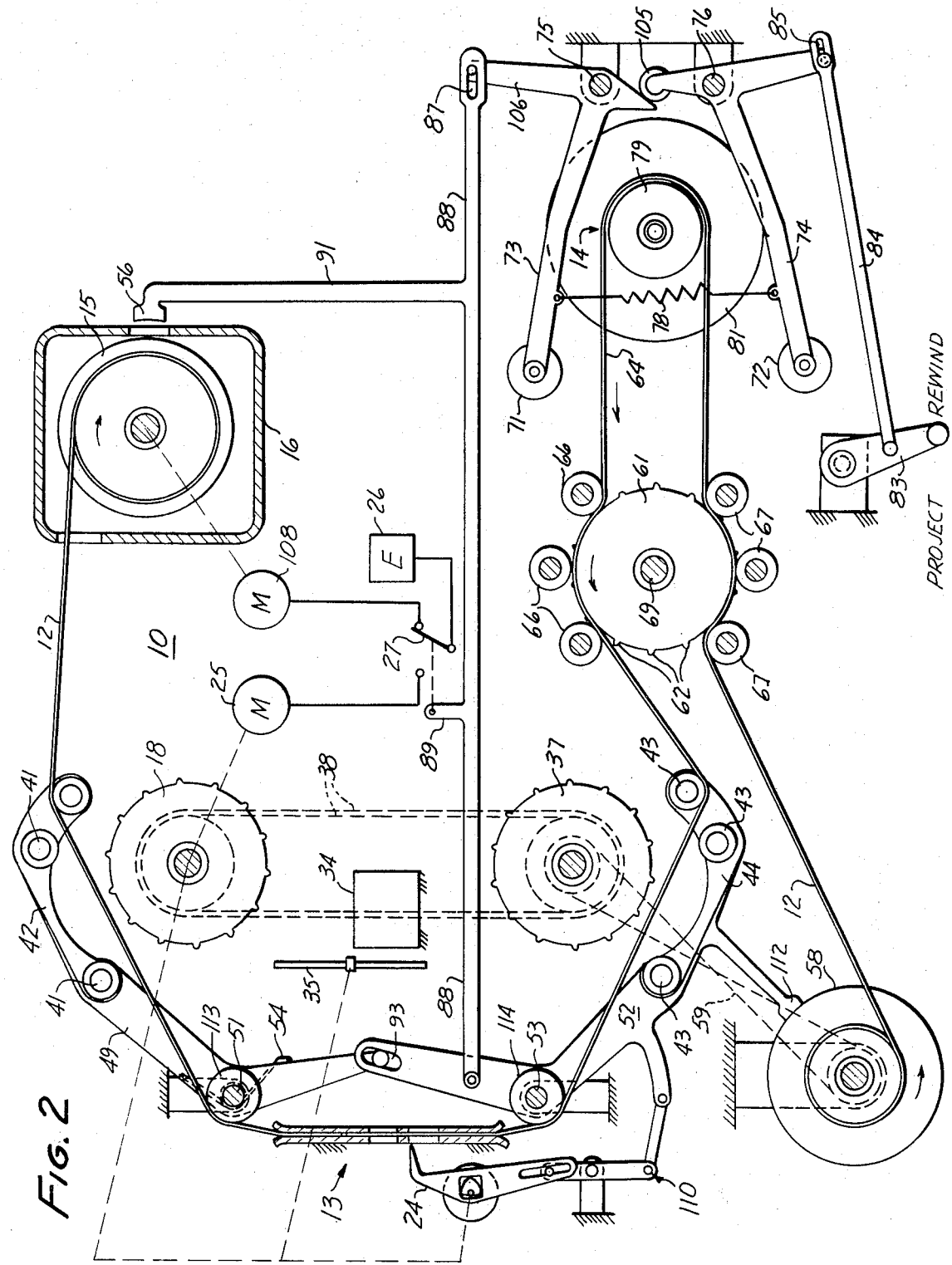

RAPID REWIND SOUND MOTION CAMERA OR PROJECTOR

BACKGROUND OF THE INVENTION

1. Field of the Invention

The subject invention relates to methods and apparatus for advancing an elongate information carrier relative to a function-performing station at different speeds. In one preferred embodiment, a sound motion picture film is moved in a camera or projector at different speeds relative to a sound transducing station.

2. Description of the Prior Art

While the description of the prior art and of preferred embodiments of the subject invention are primarily styled in terms of sound motion picture cameras and projectors, no limitation of the invention to that art is herein intended.

In advancing elongate information carriers at different speeds, difficulties are frequently encountered in that mechanisms capable of advancing the information carrier at a normal speed are not suitable for moving the information carrier at a significantly higher speed. For instance, rewinding or fast forward motion of a sound motion picture film should preferably be done at a speed in excess of what an intermittent film advance mechanism could tolerate. A partial answer to this problem would be to selectively disengage the intermittent film advance mechanism and to to provide a continuous drive for effecting rapid rewind or fast forward motion of the sound film. In that case, however, difficulties are encountered when the film loop at the sound transducing station is disengaged from the metering sprocket in conventional sound film apparatus for the purpose of rapid film rewinding or fast forward motion.

For one thing, the film is maintained in engagement with the rotary mechanical filter at the sound station, resulting in a very rapid rotation and eventual damage to the mechanical filter structure during rapid film advance or rewinding. Moreover, restoration of the requisite loop at the sound transducing station is encumbered or rendered impossible. Furthermore, the sprocket teeth of the metering wheel will rapidly be out of registry with sprocket holes in the film when the metering wheel of prior-art apparatus would be reengaged by the film after termination of a rapid film advance or rewinding operation. This would greatly increase wear and tear of the film.

SUMMARY OF THE INVENTION

The subject invention overcomes the above mentioned as well as germane disadvantages in sound motion picture film and other equipment where an elongate information carrier is moved at different speeds relative to a function-performing station, such as a sound transducer station.

The subject invention resides in a method of advancing an elongate information carrier relative to a function-performing station having parts at a first speed and alternatively moving the information carrier at a second speed several times higher than the first speed. The invention according to this method more specifically resides in the improvement comprising in combination the steps of providing a path of advancement of the information carrier towards, through and away from the function-performing station, placing said information carrier into engagement with a part of said station, engaging the information carrier at a first location and pulling the information carrier away from the station at the first location to advance the information carrier through the station, engaging the information carrier at a second location and limiting at said second location the speed of advance of the information carrier to the above mentioned first speed, engaging the information carrier both (a) between the second location and the station at a third location spaced from said first and second locations and said station and (b) between the station and the first location at a fourth location spaced from said first, second and third locations and said station for slaving (c) movement of the carrier towards the station and (d) movement of the carrier away from the station to each other, performing the function relative to the information carrier at the station, thereafter releasing the information carrier at the second location from the speed limiting engagement and releasing said information carrier from engagement with said part of said station, moving the information carrier along the above mentioned path at the second speed, and maintaining the information carrier during movement at the second speed engaged both (a) at said third location between the second location and the station and (b) at said fourth location between the station and the first location for slaving (c) movement of the carrier towards the station and (d) movement of the carrier away from the station to each other also during the carrier movement at the second speed.

It will be recognized in the further course of this disclosure that this provides for a preservation of an information carrier loop at the function-performing station without damage to the information carrier and without impediment of the carrier movement at the desired rapid second speed.

In accordance with a preferred embodiment of the subject invention, the information carrier is tensioned at the function-performing station during carrier advancement at the first speed, and is released from tensioning preparatory to and during carrier movement at the higher second speed. This, in conjunction with the above mentioned film movement slaving according to the subject invention, enables the information carrier to clear parts of the function-performing station during rapid advance or rewind.

From another aspect thereof, the subject invention resides in apparatus for performing a function relative to an elongate information carrier at a function-performing station having parts. The invention according to this aspect resides more specifically in the improvement comprising, in combination, means for advancing the information carrier in a path leading towards, through and away from the function-performing station, these advancing means including means engaging the information carrier at a first location for pulling the information carrier away from the station at the first location, means engaging the information carrier at a second location for limiting the speed of advancement of the information carrier to a first speed means for placing said information carrier into engagement with a part of said station, means for slaving movement of the carrier toward the station and movement of the carrier away from the station to each other, these slaving means including coupling means engaging the information carrier both (a) at said third location between the second location and the station and (b) at said fourth location between the station and the first location, means for performing the desired function relative to the information carrier at the station, means for selectively deactivating the speed limiting means at the second location, means for selectively moving the information carrier along the above mentioned path at a second speed several times higher than the first speed, means operatively associated with the slaving means for maintaining the information carrier in engagement with the coupling means both (a) at said third location between the second location and the station and (b) at said fourth location between the station and the first location during both carrier advancement at the first speed and carrier movement at the second speed and means operatively associated with said engagement means for deactivating said engagement means preparatory to carrier advancement at said second speed whereby said information carrier is released from said engagement with said station part during carrier advancement at said second speed.

In accordance with a preferred embodiment of the subject invention, the apparatus includes means for mounting and maintaining the slaving and coupling means in a free-running condition during both carrier advancement at the first speed and carrier movement at the second speed.

In accordance with another aspect thereof, the subject invention resides in apparatus for transducing pictorial information relative to a motion picture film and transducing sound information relative to a sound track on the motion picture film. The invention according to the latter aspect resides more specifically in the improvement comprising, in combination, means for intermittently advancing the motion picture film in a first direction, means for transducing pictorial information relative to the intermittently advancing motion pitcure film, means situated after the intermittent advancing means as seen in the first direction for continuously advancing the motion picture film at a first speed, means for transducing sound information relative to the sound track on the continuously advancing motion picture film, means for slaving movement of the motion picture film towards the sound information transducing means and movement of the motion picture film away from the sound information transducing means to each other, these slaving means including coupling means engaging the motion picture film both ahead of and after the sound information transducing means, means for pulling the motion picture film in the first direction and away from the slaving means, means for selectively deactivating the intermittent advancing means, the continuous advancing means, and the pulling means, means for moving the motion picture film at a second speed several times higher than the first speed past the deactivated intermittent advancing means and continuous advancing means, and means operatively associated with the slaving means for maintaining the motion picture film in engagement with the coupling means both ahead and after the sound information transducing means during both the motion picture film advancement in the first direction and the motion picture film movement in the second direction.

In accordance with the latter aspect of the subject invention, the latter improvement includes in said combination means for selectively tensioning the motion picture film into engagement with the sound information transducing means, means for activating the tensioning means preparatory to advancement of the motion picture film in the first direction whereby the motion picture film is in engagement with the sound information transducing means during film advancement at the first speed, and means for deactivating the tensioning means preparatory to movement of the motion picture film in the second direction whereby the motion picture film is disengaged from the sound information transducing means during film movement at the second speed.

In accordance with a related preferred embodiment of the invention, the latter improvement includes in said combination means for mounting and maintaining the slaving and coupling means in a free-running condition during both the film advancement in the first direction and the film movement in the second direction.

BRIEF DESCRIPTION OF THE DRAWINGS

The subject invention and its objects will become more readily apparent from the following detailed description of preferred embodiments thereof, illustrated by way of examples in the accompanying drawings, in which:

FIG. 1 is a diagrammatic side view of a sound motion picture projector in accordance with a preferred embodiment of the subject invention;

FIG. 2 is a view similar to FIG. 1 showing the motion picture projector in a rapid film rewind position; and FIG. 3 is a view taken on the line 3 — 3 in FIG. 1.

DESCRIPTION OF PREFERRED EMBODIMENTS

The illustrated motion picture projector 10 advances a motion picture film intermittently through an image transducing or projecting station 13 and continuously through a sound transducing or pickup station 14.

The film 12 is initially located in a wound condition on a film supply reel 15 which, in turn, is located in a film cartridge 16.

A film feed sprocket wheel 18 advances the film 12 from the supply reel 15 and cartridge 16 to the projecting station 13 as seen in the magnified section 19 of FIG. 3, the film 12 has sprocket holes 20 which are engaged by the sprocket wheel 18 and other sprocket wheels hereinafter to be described. The film 12 also carries pictorial information in the form of motion picture images 21 and sound information in the form of an optical sound track 22.

In accordance with conventional practice, the motion picture film 12 is intermittently advanced through a picture gate 23 by a pulldown claw 24 at the projecting station 13. The sprocket wheel 18 and the pulldown claw 24 are driven by an electric motor 25 which is energized from the electric power source 26 upon actuation of a double-throw switch into the position shown in FIG. 1.

Each image 21 on the film 12 is illuminated at the picture gate 23 by a lamp 29 which has a conventional reflector and condensor lens system (not shown) associated therewith. The lamp 29 is energized from an electric power source 31 upon closure of a switch 32.

The images 21 are projected with a projector lens system 34 onto a projection screen or other suitable surface (not shown). A conventional rotary shutter 35 is driven by the motor 25 to obscure projection of image parts while the film is being pulled down by the claw 24.

After having traversed the projection station 13, the film 12 is advanced by a holdback sprocket wheel 37. As indicated by the dotted lines 38, the holdback sprocket wheel 37 is coupled to the film feed sprocket wheel 18 to rotate in unison therewith. The holdback sprocket wheel 37 limits the speed of the film 12 through the sound pickup station 14 to a desired film advance speed and isolates the continuous film advance in the sound pickup station from the intermittent film advance in the projecting station.

A series of rollers 41 is located on a lifter 42 for maintaining the film 12 in engagement with the sprocket wheel 18 during film projection and operation of the pulldown claw 24. Similarly, a series of rollers 43 is located on a lifter 44 for maintaining the film 12 in engagement during film projection and operation of the pulldown claw 24. As will be mentioned in connection with FIG. 2, the lifters 42 and 44 also serve to lift the film from the sprocket wheels 18 and 37 during rapid film rewind. Conventional loop formers (not shown) may be provided for forming the loops 46 and 47 in the film 12 ahead of and after the projection station 13. These loops are necessary and are conventionally provided to enable a rapid pulldown of the film by the claw 24 during the intermittent film advancement.

The lifter 42 is mounted on a lever 49 which is pivotally mounted by a post 51. Similarly, the lifter 44 is mounted on a lever 52 which is pivotally mounted on a post 53. A spring 54 biases the lifters 42 and 44 in the position illustrated in FIG. 1. The spring 54 or another spring (not shown) auxiliary thereto also biases the double-throw switch 27 into the position illustrated in FIG. 1, and further biases a brake 56 against the film supply reel 15 to prevent excessive unwinding of the film from the reel 15.

The film 12 further engages a film takeup reel 58 which, as indicated by dotted lines 59 is driven by the motor 25 by way of the coupling 38 in order to pull the film 12 away from the sound pickup station 14 so as to advance the film through that station.

In accordance with a preferred embodiment of the subject invention, a free-running sprocket wheel 61 is provided in addition to the hold-back sprocket wheel 37. The sprocket wheel 61 has sprocket teeth 62 which engage the film 12 by way of the sprocket holes 20 both (a) between the holdback sprocket wheel 37 and the sound pickup station 14 and (b) between the sound pickup station 14 and the film takeup reel 58 in order to slave (c) movement of the film toward the sound pickup station 14 and (d) movement of the film away from the sound pickup station to each other. In this manner, the amount of film leaving the station 14 in either direction cannot exceed the amount of film entering the station 14 and vice versa. In accordance with the subject invention, this preserves the size of the loop 64 during sound pickup and during rapid film rewind and has other advantages more fully disclosed below.

A series of rollers 66 and a series of rollers 67 maintains the film 12 in engagement with the sprocket wheel 61. As seen in FIGS. 1 and 2, the rollers 66 and 67 are not movable with lifters in the manner of rollers 41 and 43. Of course, some type of lifters may be provided to facilitate threading of the film 12 preparatory to a motion picture projecting operation. However, it is essential in accordance with the subject invention that the rollers 66 and 67 maintain the film 12 in engagement with the sprocket wheel 61 during projection and sound pickup and also during rapid film rewind (and rapid film advance, if any).

In accordance with a preferred embodiment of the subject invention, the sprocket wheel 61 is not driven by anything other than the film 12 but rather is free-running both during projection and sound pickup and during rapid film rewind (and rapid film advance, if any). As seen in FIG. 3, the sprocket wheel 61 is freely rotatable about a post 69 that is mounted on a baseplate 71 at 72. The rollers 66 and 67 are also rotatably mounted by posts 73 and 74 affixed to the baseplate 71.

In accordance with a further preferred embodiment of the subject invention, the film 12 is tensioned at the sound pickup station 14 preparatory to and during film advancement at the above mentioned first speed, and the film 12 is released from such tensioning preparatory to and during rapid film rewind or other film movement at increased speed when no sound pickup is effected.

In the illustrated preferred embodiment, the tensioning means include a pair of rollers 71 and 72 and a pair of levers 73 and 74 on which the rollers are rotatably mounted. The levers 73 and 73, in turn, are pivotally mounted at 75 and 76 and are biased toward each other by a spring 78. In this manner, the film at the loop 64 is tensioned into engagement with the sound drum 79 of a rotary mechanical filter including a flywheel 81.

The tensioning device including the rollers 71 and 72 is activated upon release of a mechanical selector switch 83 from the "REWIND" position shown in FIG. 2 to the "PROJECT" position shown in FIG. 1. At that instant, a lever 84, connected to the switch 83 and coupled to the lever 74 by a lost-motion coupling 85, releases the lever 73 and 74 and the rollers 71 and 72 to their active position under the bias of the spring 78. The spring 78 also acts at that instant through the lever 73, a lost-motion coupling 87 and levers or rods 88, 89 and 91 to position the lifters 42 and 44, the switch 27 and the brake 56 into their above mentioned positions shown in FIG. 1. As seen in FIGS. 1 and 2, the lever 88 acts on the lever 52 and motion of the lever 52 is transmitted to the lever 49 by way of a lost-motion coupling 93.

It will now be recognized that the takeup reel 58 pulls the film 12 away from the sound pickup station 14 and that the holdback sprocket 37 limits the speed of the film in the "PROJECT" mode of operation to the desired sound pickup speed. Of course, the sound pickup speed as well as the intermittent advance velocity of the film may be variable in accordance with standard practice.

Since the ends of the film loop 64 are coupled to each other by the sprocket wheel 61, positive tension pulls by the takeup reel 58 are transmitted to the holdback sprocket wheel 37 which, therefore, acts as a metering sprocket wheel relative to the film advance speed through the sound station 14. Since the sprocket wheel 61 mechanically by-passed the film loop 64, no distrubance of the length of that film loop results from a transmission of positive tension pulls. Due to the flexible nature of the film 12, no negative tension pulls are transmitted from the takeup reel 58 to the sprocket wheel 61.

In accordance with conventional practice, the sound pickup station 14 may include a sound pickup lamp 96 which, upon closure of a switch 97, is energized from an electric source 98 of direct-current or high-frequency energy. Further in accordance with conventional practice, the lamp 98 may illuminate a photocell 99 by way of a lens 100, an aperture plate 101 and the sound track 22 (see FIG. 3) of the film 12. The quality of the continuous motion of the film 12 through the sound pickup station is enhanced by the mechanical filter including the flywheel 81 which is rotated by way of the sound drum 79 by the film 12 which is tensioned against the sound drum by the rollers 71 and 72 and bias spring 78.

The picked-up sound is processed and reproduced by conventional type of sound reproducing equipment 103. In accordance with customary practice, the sound information in the track 22 is displaced from the pictorial information in the images 21 by an amount ocrresponding to the distance, measured along the film, between the projection aperture in the picture or film gate 23 and the aperture in the aperture plate 101. In this manner, the sound is synchronized with the motion picture display.

Upon completion of a projecting operation, the mechanical switch 83 is moved from the "PROJECT" position shown in FIG. 1 to the "REWIND" position shown in FIG. 2. The mechanical switch 83 may include a conventional type of catch so that it will at least temporarily remain in the rewind position despite the bias of the springs 54 and 78. However, such a catch (not shown) is not necessary if it is desired to rewind the film only as long as the switch 83 is held in its "REWIND" position.

In the "REWIND" position of the switch 83, the lever 84 acts through the coupling 85 to pivot the lever 74 outwardly and to lift the tension roller 72 away from the film as shown in FIG. 2. Simultaneously, an extension 105 of the lever 74 pivots the lever 73 outwardly and lifts the tension roller 71 away from the film. In this manner, the tensioning device including the rollers 71 and 72 is deactivated against the bias of the spring 78. An extension 106 of the lever 73 acts through the coupling 87 on the lever or rod 88 to release the brake 56 from the supply reel 15 and to swing the levers 49 and 52 and the lifters 42 and 44 outwardly. This, in turn, releases the film 12 from the sprocket wheels 18 and 37. At the same time, the lever 89 moves the double-throw switch 27 from its position shown in FIG. 1 to its position shown in FIG. 2 so as to connect a motor 108 to the electric energy source 26.

The motor 108 rotates the supply reel 15 in a sense opposite to the sense in which it was rotated during motion picture display and sound reproduction. (If desired, the same motor, with appropriate gearing, can be used to perform the function of motors 25 and 108). Concurrently, the outwardly swinging lever 52 acts on a linkage 110 for moving and maintaining the pulldown claw 24 out of engagement with the film 12 pending resumption of a motion picture projecting operation. The outwardly swinging lever 52 also moves a brake 112 into engagement with the film takeup reel 58 so as to prevent an excessively rapid rewinding of the film from the takeup reel.

Idling rollers 113 and 114 are rotatably mounted on the posts 51 and 53 to guide the film during the rewinding process.

The motor 108 imparts a rewinding speed to the film 12 which is several times higher than the maximum speed during motion picture projection and sound reproduction. Of course, the term "rewinding speed" and other expressions of like import are not herein intended to limit rewinding to only one specific speed, inasmuch as the rewinding speed will increase with increasing diameter of the film roll on the supply reel 15 if the speed of rotation of the motor 108 remains constant.

In accordance with the subject invention, the rollers 66 and 67 maintain the film 12 at both ends of the film loop 64 in engagement with the sprocket wheel 61 and sprocket teeth 62 thereon. In this manner, the loop 64 will retain during the rewinding operation the same length as it had during the projecting and sound reproducing operation. Since the tensioning rollers 71 and 72 are released from the film in the rewinding operation, the film at the loop 64 is lifted from the sound drum 79 by virtue of its own stiffness and will not rotate the flywheel 81.

Since the flywheel 81 has thus been deactivated along with the sprocket wheels 18 and 37, and pulldown claw 24 and since the sprocket wheel 61 is free-running, the motor 108 is easily able to rewind the film 12 into the cartridge 16 at relatively high speeds.

If it is desired to resume motion picture projection and sound reproduction, the switch 83 is moved back into the "PROJECT" position shown in FIG. 1 and described above. Unless the film has been removed from the projector, no registry problems are at that or any other juncture encountered between the sprocket teeth 62 and the sprocket holes 20, inasmuch as the film remains in engagement with the sprocket wheel 61 at both ends of the loop 64 when the projector is switched from the "PROJECT" mode to the "REWIND" mode.

Considering the embodiment shown in FIGS. 1 and 2, it will be recognized that the sprocket wheel 37 acts as an isolating element between the intermittently advancing film in the projecting station 13 and the continuously advancing film in the sound pickup station 14. The sprocket wheel 37 also acts as a metering wheel in the sense that it dictates the film speed through the sound pickup station. In contrast to some prior-art equipment, in which a sprocket wheel of the type of sprocket wheel 61 acted as both a holdback sprocket and a metering sprocket, it is to be observed that the sprocket wheel 61, according to the principles of the subject invention, does not act as a holdback wheel. Rather, the sprocket wheel 61 is free-running in accordance with the illustrated preferred embodiment. On the other hand, the sprocket wheel 61 may be considered a metering wheel in the sense that it controls the amount of film entering the loop 64 in terms of the amount of film leaving the loop 64 relative to the sound pickup station 14.

Various modifications or variations within the spirit and scope of the subject invention will become apparent or suggest themselves to those skilled in the art. For instance, the principles of the subject invention are not limited to a rapid rewinding of the film or other information carrier, but may also be employed to permit a fast forward motion of the film or other information carrier. By way of example, the tension rollers 71 and 72 and the pulldown claw 24 may be released and the lifters 42 and 44 may be swung outwardly as shown in FIG. 2, and the takeup reel 58 may be driven rapidly for a fast forward motion of the film 12. In this manner, features on the motion picture film may be bypassed at high speed if a viewing thereof at the particular time is not desired.

Moreover, the information carrier need not necessarily by a motion picture film. Instead, the principles of the subject invention are, for instance, applicable to sprocketed optical or magnetic sound or video recording tape, or even to unsprocketed recording tape if a good frictional engagement is maintained between the tape, a friction wheel of the type of wheel 61 and nip rollers of the type of rollers 66 and 67.

Also, the principles of the subject invention may be applied to function-performing stations other than sound reproduction stations. For instance, the function-performing station with respect to which the loop 64 is maintained in accordance with the principles of the subject invention may be a magnetic sound pickup station operating with a magnetic sound track, an optical or magnetic sound recording station, a chemical film developing station, a film or tape cleaning station or the like.

Further variations or modifications within the spirit and scope of the invention will become apparent from or suggest themselves by the present disclosure of the subject invention.

I claim:

1. In a method of advancing an elongate information carrier relative to a function-performing station having parts at a first speed and alternatively moving said information carrier at a second speed several times higher than said first speed, the improvement comprising in combination the steps of:
providing a path of advancement for said information carrier toward, through and away from said station;
placing said information carrier into engagement with a part of said station;
engaging said information carrier at a first location and pulling said information carrier away from said station at said first location to advance said information carrier through said station;
engaging said information carrier at a second location and limiting at said second location the speed of advance of said information carrier to said first speed;
engaging said information carrier both (a) between said second location and said station at a third location spaced from said first and second locations and said station and (b) between said station from said first location at a fourth location spaced from said first, second and third locations and said station for slaving (c) movement of said carrier toward said station and (d) movement of said carrier away from said station to each other;
performing said function relative to said information carrier at said station;
thereafter releasing said information carrier at said second location from said speed limiting engagement and releasing said information carrier from engagement with said part of said station;
moving said information carrier along said path at said second speed; and
maintaining said information carrier during said movement at said second speed engaged both (a) at said third location between said second location and said station and (b) at said fourth location between said station and said first location for slaving (c) movement of said carrier toward said station and (d) movement of said carrier away from said station to each other also during said carrier movement at said second speed.

2. A method as claimed in claim 1, wherein:
said information carrier is tensioned into engagement with said part of said station during carrier advancement at said first speed; and
said information carrier is released from said tensioning and engagement preparatory to and during carrier movement at said second speed.

3. A method as claimed in claim 1, wherein:
said station is provided with means for performing a function relative to said information carrier;
said information carrier is tensioned into engagement with said function-performing means during carrier advancement at said first speed; and
said information carrier is released from engagement with said function performing means by releasing said tensioning preparatory and during carrier movement at said second speed.

4. A method as claimed in claim 1, wherein:
said information carrier is moved in a first direction during advance at said first speed; and
said information carrier is moved in a second direction opposite to said first direction during movement at said second speed.

5. In apparatus for performing a function relative to an elongate information carrier at a function-performing station having parts, the improvement comprising in combination:
means for advancing said information carrier in a path leading toward, through and away from said station, said advancing means including means engaging said information carrier at a first location for pulling said information carrier away from said station at said first location;
means engaging said information carrier at a second location for limiting the speed of advancement of said information carrier to a first speed;
means for placing said information carrier into engagement with a part of said station;
means for slaving movement of said carrier toward said station and movement of the carrier away from said station to each other, said slaving means including coupling means engaging said information carrier both (a) at a third location spaced from said first and second locations and said station between said second location and said station and (b) at a fourth location spaced from said first, second and third locations and said station between said station and said first location;
means for performing said function relative to said information carrier at said station;
means for selectively deactivating said speed limiting means at said second location;
means for selectively moving said information carrier along said path at a second speed several times higher than said first speed;
means operatively associated with said slaving means for maintaining said information carrier in engagement with said coupling means both (a) at said third location between said second location and said station and (b) at said fourth location between said station and said first location during both said carrier advancement at said first speed and said carrier movement at said second speed; and
means operatively associated with said engagement means for deactivating said engagement means preparatory to carrier advancement at said second speed whereby said information carrier is released from said engagement with said station part during carrier advancement at said second speed.

6. An apparatus as claimed in claim 5, including in said combination:

means for mounting and maintaining said slaving and coupling means in a free-running condition during both said carrier advancement at said first speed and said carrier movement at said second speed.

7. An apparatus as claimed in claim 6, including in said combination:
   means supporting said information carrier at said station;
   selectively actuable means for tensioning said information carrier into engagement with said supporting means;
   means operatively associated with said tensioning means for activating said tensioning means preparatory to carrier advancement at said first speed whereby said information carrier is tensioned into engagement with said supporting means during carrier advancement at said first speed; and
   means operatively associated with said tensioning means for deactivating said tensioning means preparatory to carrier advancement at said second speed whereby said information carrier is released from engagement with said supporting means during carrier advancement at said second speed.

8. An apparatus as claimed in claim 5, wherein:
   said means for selectively moving the information carrier at said second speed include means for rapidly rewinding said information carrier.

9. In apparatus for transducing pictorial information relative to a motion picture film and transducing sound information relative to a sound track on said motion picture film, the improvement comprising in combination:
   means for intermittently advancing said motion picture film in a first direction;
   means for transducing pictorial information relative to said intermittently advancing motion picture film;
   means situated after said intermittent advancing means as seen in said first direction for continuously advancing said motion picture film at a first speed;
   means for transducing sound information relative to said sound track on the continuously advancing motion picture film;
   means for slaving movement of said motion picture film toward said sound information transducing means and movement of said motion picture film away from said sound information transducing means to each other, said slaving means including coupling means engaging said motion picture film both ahead of and after said sound information transducing means;
   means for pulling said motion picture film in said first direction and away from said slaving means;
   means for selectively deactivating said intermittent advancing means, said continuous advancing means, and said pulling means;
   means for moving said motion picture film at a second speed several times higher than said first speed past said deactivated intermittent advancing means and continuous advancing means;
   means operatively associated with said slaving means for maintaining said motion picture film in engagement with said coupling means both ahead of and after said sound information transducing means during both said motion picture film advancement at said first speed and said motion picture film movement at said second speed;
   means for selectively tensioning said motion picture film into engagement with said sound information transducing means;
   means for activating said tensioning means preparatory to and during advancement of said motion picture film in said first direction whereby said motion picture film is in engagement with said sound information transducing means during film advancement at said first speed; and
   means for deactivating said tensioning means preparatory to and during movement of said motion picture film at said second speed whereby said motion picture film is disengaged from said sound information transducing means during film movement at said second speed.

10. An apparatus as claimed in claim 9, wherein:
    said sound information transducing means include rotary mechanical filter means;
    said tensioning means include means for selectively tensioning said motion picture film into engagement with said rotary mechanical filter means; and
    said deactivating means include means for disengaging said motion picture film from said rotary mechanical filter means preparatory to and during film movement at said second speed.

11. An apparatus as claimed in claim 9, including in said combination:
    means for mounting and maintaining said slaving and coupling means in a free-running condition during both said film advancement at said first speed and said film movement at said second speed.

12. An apparatus as claimed in claim 9, wherein:
    said motion picture film has sprocket holes;
    said slaving and coupling means include a sprocket wheel having sprocket teeth engaging said motion picture film at said sprocket holes both ahead of and after said sound information transducing means; and
    said apparatus including means for mounting and maintaining said sprocket wheel in a free-running condition during both said film advancement at said first speed and said film movement at said second speed.

* * * * *